United States Patent [19]

Lalin et al.

[11] Patent Number: 4,762,004
[45] Date of Patent: * Aug. 9, 1988

[54] GAS FLOWMETER AND SOAP BUBBLE GENERATOR

[75] Inventors: Hill S. Lalin, Wayne; William T. Fleming, Jr., Glen Gardner; Jorge E. Bermudez, Haledon, all of N.J.

[73] Assignee: Gilian Instrument Corp., Wayne, N.J.

[*] Notice: The portion of the term of this patent subsequent to Sep. 8, 2004 has been disclaimed.

[21] Appl. No.: 911,369

[22] Filed: Sep. 25, 1986

Related U.S. Application Data

[63] Continuation-in-part of Ser. No. 837,847, Mar. 10, 1986, Pat. No. 4,691,577.

[51] Int. Cl.⁴ .............................................. G01F 1/708
[52] U.S. Cl. .................................................. 73/861.05
[58] Field of Search ..................................... 73/861.05

[56] References Cited

U.S. PATENT DOCUMENTS 3,248,941  5/1966  McArthur ..................... 73/861.05
4,691,577  9/1987  Lalin et al. ..................... 73/3 X Primary Examiner—Tom Noland
Attorney, Agent, or Firm—Eugene Lieberstein

[57] ABSTRACT

A gas flow measuring device comprising a flowtube, a soap bubble generator for generating a film of soap, a manually adjustable member for controlling the transfer of the soap film to the flowtube and a set of detectors spaced apart along the flowtube for measuring the time displacement of the soap bubble between the spaced positions of the detectors. The manually adjustable member is preferably a hoop surrounding the flowtube. A soap bubble is formed by immersing the hoop into the soap solution and withdrawing it. A soap film is transferred to the flowtube by raising the hoop to the mouth of the flowtube. In a second embodiment, a sleeve with slots surrounds a flowtube with slots. The sleeve is rotated into alignment with the flowtube to transfer a soap film.

20 Claims, 4 Drawing Sheets

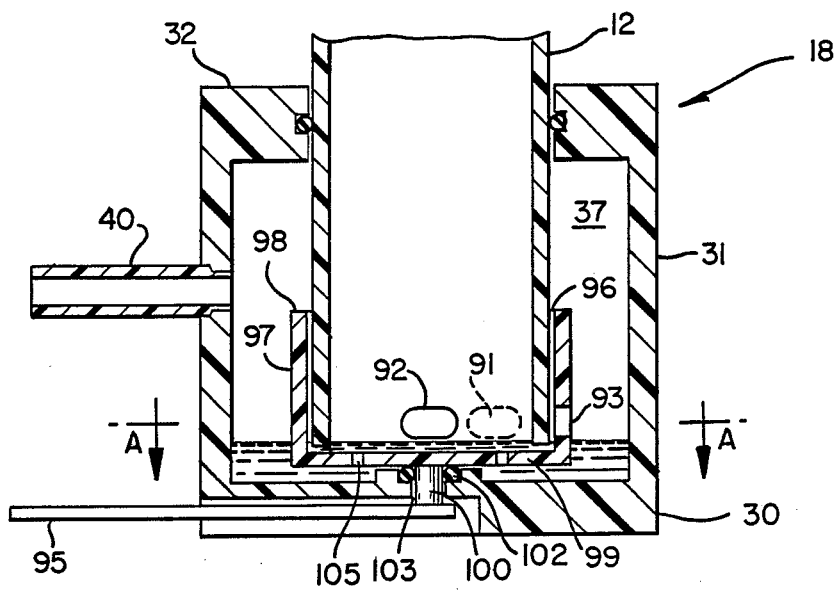
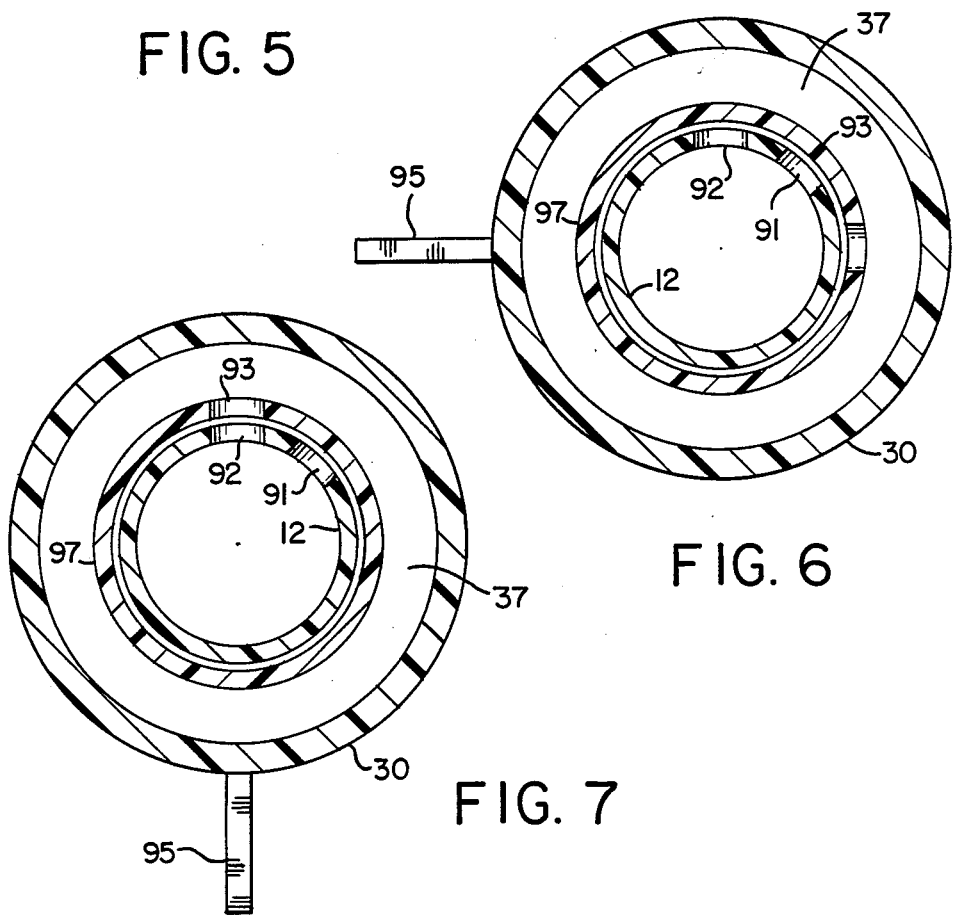
FIG. 5
FIG. 6
FIG. 7

4,762,004

GAS FLOWMETER AND SOAP BUBBLE GENERATOR

This application is a continuation-in-part of U.S. patent application Ser. No. 837,847, filed Mar. 10, 1986, now U.S. Pat. No. 4,691,577, and entitled "Soap Film Gas Flowmeter."

FIELD OF THE INVENTION

This invention relates to gas flow measuring devices which operate on the principle of measuring the time displacement of a soap bubble between two points on a flow tube. The displacement in time is converted to a measurement of flow.

BACKGROUND OF THE INVENTION

The ability to generate a coherent soap bubble with reliability over a range of flow rates, particularly at high gas flow rates, is a major limitation of prior art flowmeter designs. In applicant's parent application, as above identified, a flowmeter is described incorporating a bubble generator which forms a bubble at the mouth of the flowtube. The bubble generator includes an opening in the flowtube in combination with a shutter to control the size of the opening. The arrangement operates as a variable bypass for air flow. The size of the opening in the flowtube is varied based upon the rate of gas flow to be measured.

The present invention is directed to other embodiments for generating a coherent soap bubble in the flowtube and offers advantages in simplicity of design and manufacture over the bubble generating arrangements taught in the parent application.

OBJECTS OF THE INVENTION

It is an object of the present invention to provide a soap film gas flowmeter with an improved bubble generator which can generate a single soap bubble under positive manual control from very low to extremely high flow rates of up to 30 liters per minute or more.

It is an even further object of the present invention to provide a soap film gas flowmeter and bubble generator to control bubble generation with greater precision and accuracy than heretofore possible.

SUMMARY OF THE INVENTION

In a first embodiment of the present invention, the soap film flowmeter comprises: a first closed chamber housing a soap solution; gas inlet means extending into the first chamber at a flow rate to be measured; a second closed chamber spaced from the first chamber; a flowtube having a hollow body extending from the first chamber to the second chamber through which the gas from the first chamber passes; gas exit means extending into the second chamber for discharging the gas introduced in the first chamber; bubble generating means for generating a bubble from said soap solution and means for measuring the time displacement of the bubble through the flowtube between two predetermined location points along the flowtube wherein said bubble generating means comprises a hoop surrounding said flowtube in said first chamber with said hoop having an open annulus larger in diameter than the diameter of the flowtube and means for controllably depressing said hoop into said soap solution to pick up a soap bubble and for raising said hoop to said flowtube to transfer said soap bubble to the flow tube.

In a second embodiment of the present invention, the gas flowmeter and bubble generator comprises: a flowtube having a hollow body and opposite open ends through which a soap film is propelled, said flowtube being substantially vertically aligned between a first closed chamber into which the bottom open end of said flowtube extends and a second closed chamber into which the top open end of said flowtube extends; gas inlet means extending into said first chamber for introducing gas into said flowmeter at a flow rate to be measured using the flowmeter; gas exit means extending into said second closed chamber for discharging said gas from said flowmeter; at least two slotted openings in said flowtube of predetermined size disposed above the bottom open end thereof within said first chamber; a soap solution contained in said first chamber at a level in a range between the bottom open end of said flowtube and said slotted opening and a rotatable member surrounding said flowtube in said first chamber to form a narrow clearance between said rotatable member and said flowtube, with said rotatable member having a slot disposed at a substantially equal height relative to said slotted openings and means for rotatably adjusting the position of said rotatable member relative to the longitudinal axis of said flowtube for juxtaposing said slot into registration with said slotted opening in one position and out of registration in another position.

In the first embodiment of the present invention, the soap bubble is formed by immersing the hoop into the soap solution and withdrawing it. The soap bubble is transferred to the flowtube by raising the hoop to the mouth of the flow tube.

In the second embodiment of the present invention, the soap bubble is generated by rotatably controlling the position of a slot in a sleeve surrounding the flowtube relative to a pair of slotted openings in the flow tube. The sleeve surrounds the flowtube in relatively close proximity to permit the soap solution between the sleeve and flowtube to rise above the level of the soap solution by capillary attraction when the slot in the sleeve is rotated to a position out of alignment relative to the slotted opening in the flow tube. The capillary rise in soap solution allows the soap solution to cover the slotted opening in the flowtube forming a soap film. When the sleeve is rotated to align the slot with a slotted opening in the flow tube, the soap film extends across the mouth of the flowtube to form a coherent soap bubble.

BRIEF DESCRIPTION OF THE DRAWINGS

Other features, objects and advantages of the present invention will become apparent from the following detailed description of the invention when read in conjunction with the accompanying drawings of which:

FIG. 5 is a view in vertical section of a bubble generator for a flowmeter embodying the principles of FIGS. 3 and 4;

FIG. 6 is a cross-sectional top view of FIG. 5 taken along the lines A—A of FIG. 5; and FIG. 7 is another cross-sectional top view of FIG. 5 taken along the lines A—A of FIG. 5 showing the manual control lever rotated ninety (90) degrees from its position in FIGS. 5 and 6.

DETAILED DESCRIPTION OF INVENTION

Figure 1:
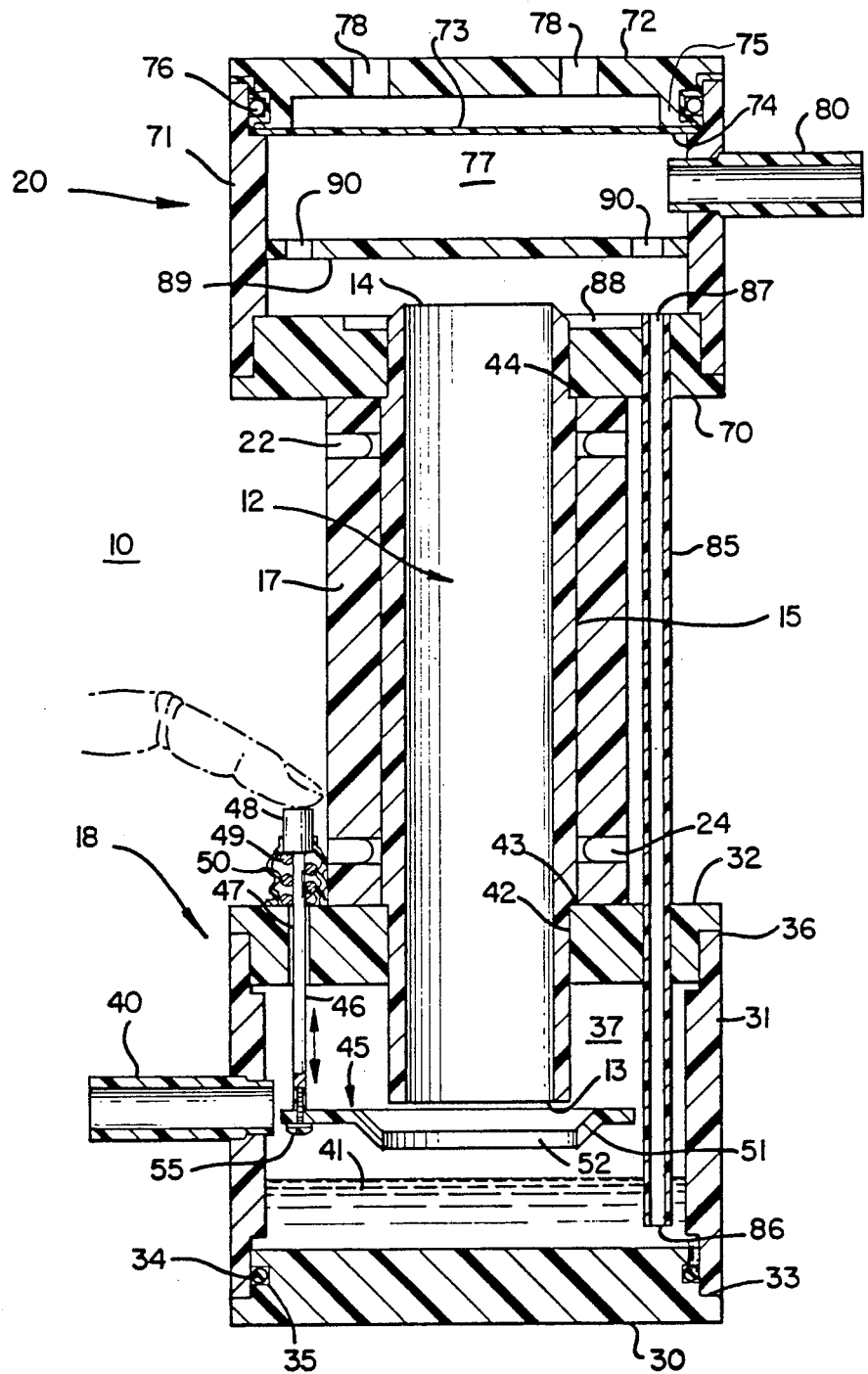
FIG. 1 is a view in vertical section of one preferred embodiment of the flowmeter of the present invention.

The soap film gas flowmeter of the present invention is identified by the reference numeral 10 and as more particularly shown in FIG. 1 comprises a hollow flowtube 12 having a bottom open end 13, a top open end 14 and a cylindrical body 15 of uniform diameter. The flowtube 12 is mounted in a block 17 supported between a lower assembly 18 and an upper assembly 20. The block 17 contains two sets of conventional optical photodetector sensing elements 22 and 24 respectively. The photodetectors 22 and 24 are spaced a fixed distance apart along the flowtube 12 and operate to measure the displaced transit time of a soap film or bubble as it moves between the two sensor locations. The operation of the photodetectors 22 and 24 and the method of calculating the transit time between the sensor locations is conventional and does not form a part of the present disclosure. Moreover, for purposes of the present invention the sensors 22 and 24 need not be photoelectrical devices and the transit time may be measured using a stop watch by visually observing the position of the soap film as is conventionally done with a calibrated burette.

The lower assembly 18 of the flowmeter 10 includes a base support 30, an upright wall 31 and a top wall 32. The upright wall 31 is a tubular body mounted between the base support 30 and the top wall 32. The base support 30 may be machined to provide a ledge 33 to support the upright wall 31 and to permit the upright wall 31 to be secured to the base support 30 using any conventional cement or adhesive. An O-ring 34 is placed in a grooved slot 35 in the base support 30 to seal the surfaces between the upright wall 31 and the base support 30.

The top wall 32 is mounted over the upright wall 31 and securely affixed thereto preferably by bonding the mating surfaces 36 using a conventional adhesive or cement to form a closed chamber 37. An inlet conduit 40 extends into the chamber 37 through the upright wall 31. The inlet conduit 40 is connected to an air or gas supply (not shown) into the chamber 37 at a flow rate to be measured by the flowmeter 10. A supply of a conventional soap solution 41 is introduced into the chamber 37 through the inlet conduit 40 to a predetermined level below the open bottom end 13 of the flowtube 12.

The flowtube 12 extends into the chamber 37 through an opening 42 in the top wall 32. The flowtube 12 is machined down at its opposite ends to form a lower ledge 43 and an upper ledge 44 respectively. The lower ledge 43 supports the flowtube 12 over the lower assembly 18 whereas the upper ledge 44 maintains the position of the flowtube 12 in the upper assembly 20. The body 15 of the flowtube 12 is preferably cemented to the lower assembly top wall 32 about the opening 42. Alternatively, an O-ring can be used if the flowtube 12 is to be removable.

A hoop 45 surrounds the flowtube 12 within the closed chamber 37. The hoop 45 is supported by a shaft 46 which extends through an opening 47 in the top wall 32. A push button 48 is mounted over the shaft 46. A compression spring 49 surrounds the shaft 46 between the top wall 32 and the push button 48. The spring 49 and the section of the shaft 46 extending above the top wall 32 is covered by a boot or flexible jacket 50 which is securely mounted between the push button 48 and the top wall 32 to seal the opening 47. The shaft 46 is connected to the hoop 45 by means of a threaded screw 55. Upon depressing and releasing the pushbutton 49 the hoop 45 is moved along a substantially vertical path to generate and transfer a soap bubble as will be more fully explained in connection with FIGS. 2A through 2G. The pushbutton 48 is shown partially pressed down in FIG. 1 to show the hoop 45 in an intermediate position between the open end 13 of the flowtube 12 and the top of the soap solution 41.

The hoop 45 has an annular body 51 with a central opening 52 of preferably circular geometry and a diameter which is larger than the diameter of the flowtube 12. The annular body 51 is inclined at an acute angle to the horizontal of preferably 45 degrees so that misalignment of the annular body 51 relative to the flowtube 12 is not critical.

Figure 2A:
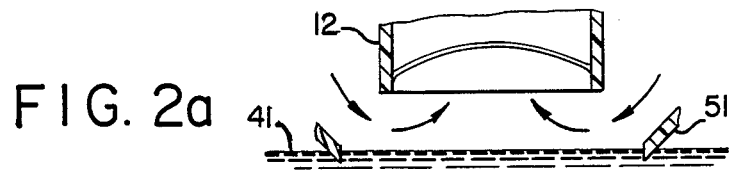
FIGS. 2A through 2G are diagrammatic representations of the formation and transfer of a soap bubble from the soap bubble solution in accordance with the present invention.
Figure 2B:
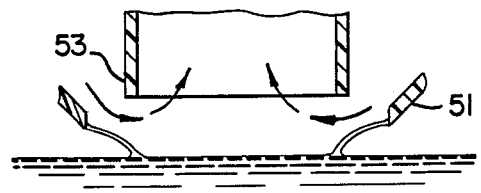
Figure 2C:
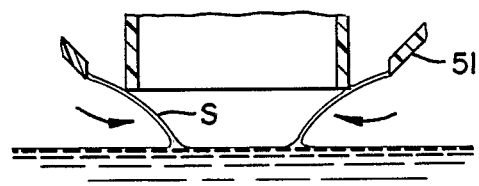
Figure 2D:
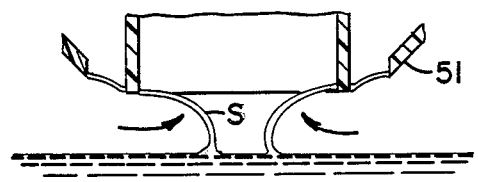
Figure 2E:
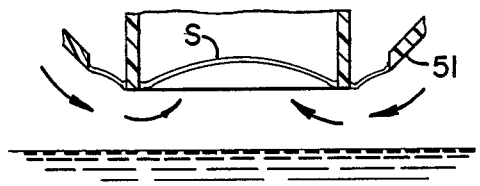
Figure 2F:
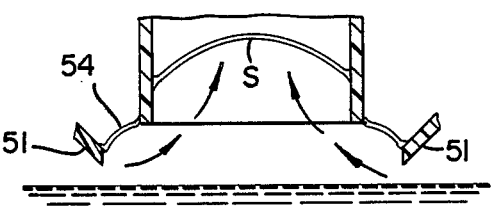
Figure 2G:
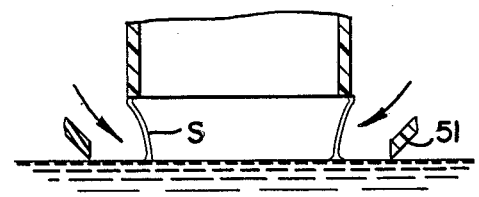

The formation and transfer of a soap bubble from the soap solution 41 to the flowtube 12 follows the progression shown diagrammatically in FIGS. 2A through 2G. In FIG. 2A the pushbutton 48 is shown fully depressed with the annular body 51 below the surface of the soap solution 41. In FIGS. 2B and 2C the hoop 45 is shown being progressively raised from the soap solution 41 for drawing a soap film S out of the soap solution 41 and into contact with the mouth 53 of the flowtube 12. In FIG. 2D the soap film S is drawn into the flowtube 12 by the air flow as shown by the arrows. FIG. 2E shows the soap film S as a coherent soap bubble ready to be advanced upward of the flowtube 12 in response to air flow. FIG. 2F shows the soap bubble S moving upward along the body of the flowtube 12. A residue of soap film 54 remains connecting the hoop annular body 51 to the mouth 53 of the flowtube 12. As the hoop 45 is relowered into the soap solution 41 as shown in FIG. 2G the residue of soap film 54 may bridge the space between the mouth 53 of the flowtube and the soap solution to permit a second soap bubble S to be formed. Thus, for each complete cycle in which the hoop 45 is lowered, raised and relowered, two soap bubbles will, in theory, be generated.

The upper assembly 20 of the flowmeter 10 includes a lower wall 70, an upright wall 71 and a top wall 72. The upright wall 71 is a tubular body mounted upon and cemented to the lower wall 70. A flexible diaphragm 73 of conventional elastic material is mounted over an annular ledge 74 in the upright wall 71 and held securely in place at its periphery between a depending section 75 of the top wall 72 and the annular ledge 74. An O-ring 76 is mounted around the elastic diaphragm 73 to hold the diaphragm 73 taut and to form a seal between the top wall 72 and the upright wall 71. A closed chamber 77 is formed in the space between the diaphragm 73, the upright wall 71, and the lower wall 70. The flowtube 12 extends into the closed chamber 77 above the lower wall 70 to form an overhang with the lower wall 70. The lower wall 70 is seated upon the upper ledge 44 of the flowtube and cemented thereto. An exit conduit 80 extends into the chamber 77 through the upright wall 71 for discharging the air or gas directed through the flowmeter 10. The top wall 72 has openings 78 for providing direct ingress and egress between ambient atmosphere and the space 79 directly above the diaphragm 73.

A drain tube 85, mounted adjacent to the support block 17, extends from the upper assembly 20 into the chamber 37 of the lower assembly 18. The drain tube 85 has an open bottom end 86 submerged beneath the soap solution 41. The drain tube 85 also has an open top end 87 which extends vertically below the open top end 14 of the flowtube and slightly below the level of a well or tough 88 formed in the lower wall 70 for collecting the residue of soap solution after each soap film collapses.

A barrier wall 89 has holes or openings 90 which preferably lie adjacent the wall 71 of a size and number sufficient to assure direct communication without restriction between the flowtube 12 and the exit conduit 80 through the chamber 77. The barrier wall 89 is separated from the top open end 14 of the flowtube to permit the soap film to balloon outwardly before contacting the barrier wall.

Pulsations in air flow are attenuated in the flowtube 12 by the flexible diaphragm 73 which operates as a damper. Any pulsations or sudden changes in the rate of air flow through the flowtube 12 will deflect the diaphragm 73 to attenuate the pulsation. A pulsation in gas flow occurs each time a soap bubble is generated. Pulsations may also be present in the incoming air flow with its magnitude dependent upon how well the air flow is regulated.

When the soap film or bubble reaches the open top end 14 of the flowtube 12 the soap film is forced to balloon outwardly until it contacts the barrier wall 89. Upon contacting the barrier wall 89 the soap film spreads laterally finally collapsing into the trough 88 from where the residue of soap solution is partially drained and recovered.

Figure 3:
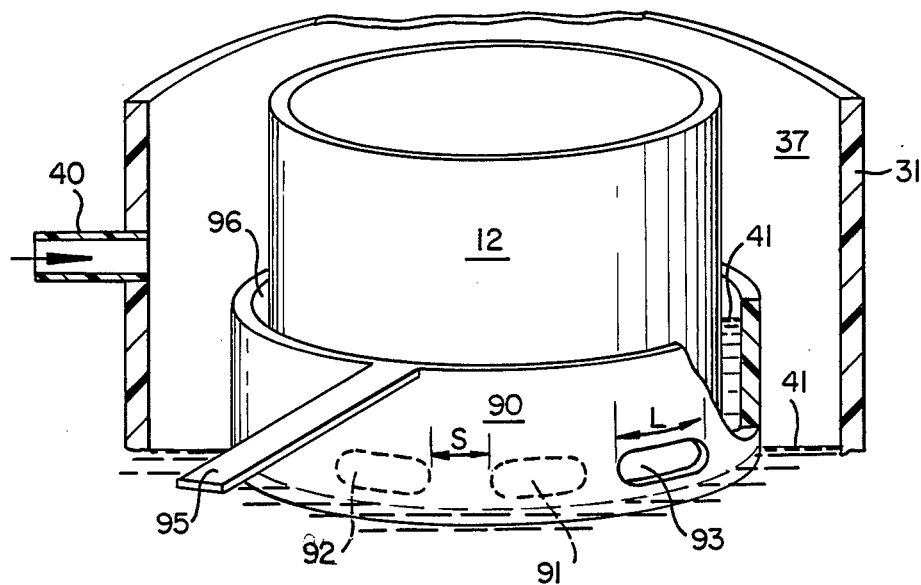
FIG. 3 is a diagrammatic view in perspective of a second preferred embodiment of a bubble generator for the flowmeter of the present invention shown in the primed position.

FIG. 3 shows, in perspective, an alternate bubble generator arrangement for the flow meter 10 of FIG. 1. The bubble generator arrangement of FIG. 3 would replace the hoop 45, shaft 46 and pushbutton assembly 48 of FIG. 1. In place thereof, a sleeve 90 is mounted over at least a section of the flowtube 12 within the chamber 37 of the lower assembly 18. The flowtube 12 has two openings 91 and 92, located substantially adjacent the open bottom of the flowtube 12. The sleeve 90 also has a slot 93 disposed vertically at the same height relative to the slotted openings 91 and 92. The slotted openings 91 and 92 are spaced a distance "S" apart from each other with the distance "S" being smaller than the length "L" of slot 93. The sleeve 90 is also connected to a manually rotatable lever arm 95 for rotating the sleeve about the longitudinal axis of the flowtube 12. FIG. 3 is a conceptual drawing and the means for vertically supporting the sleeve 90 in the position shown in FIG. 3 is not shown. A preferred support arrangement to implement the concept of FIG. 3 is shown in FIGS. 5 through 7 as will be more fully explained later.

The flowtube 12 is held suspended along the longitudinal control axis of the flowmeter with the soap solution 41 maintained in chamber 37 at a height level with the open bottom end of the flowtube 12 or above it but below the position of the slotted openings 91, 92 and slot 93. The sleeve 90, should be of a diameter slightly larger than the diameter of the flowtube 12 to form a narrow clearance 96.

Air flows through the gas inlet 40 into the chamber 37. With the lever 95 rotated into the primed position shown in FIG. 3, the slot 93 is out of registration with either opening 91 or 92. By capillary attraction the soap solution 41 rises in the narrow clearance space 96 to a level substantially above the level of the soap solution and the slotted openings 91 and 92 thereby wetting the slotted openings 91 and 92. In this position, air passes through the soap solution into the flowtube causing turbulance in the soap solution at the open bottom end of the flow tube. This generates many bubbles which wets the inside of the flow tube.

Figure 4:
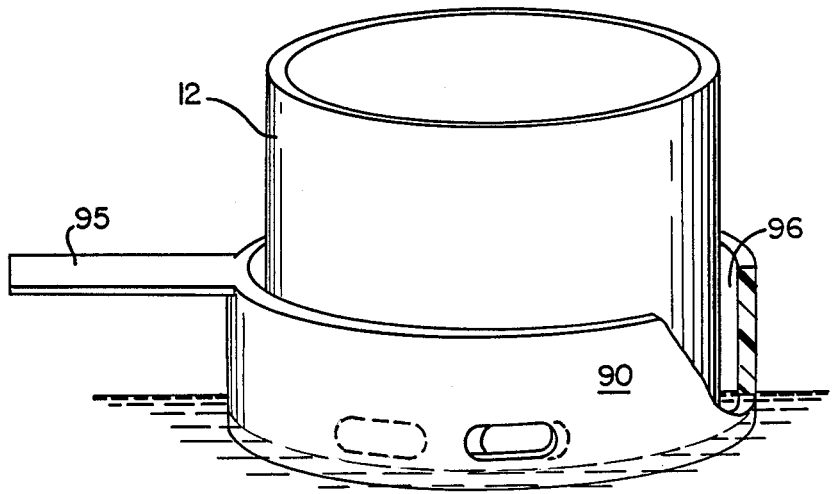
FIG. 4 is a view similar to FIG. 3 with the sleeve shown in a rotated position relative to FIG. 3.

Once the manual lever 95 is rotated into a position to cause the slot 93 to overlap with either slotted opening 91 or 92, as shown in FIG. 4, the soap film on such slotted opening is extended across the flowtube by inrushing air to form a coherent soap bubble in the flowtube. This soap bubble is propelled up the flowtube by the inrushing air. Total positive control is thus achieved over the formation of a soap bubble. By moving the slot 93 from slotted opening 91 to slotted opening 92 another bubble can be generated in succession. However, the slot 93 must be of a length "L" which is longer than the separation "S" between the slotted openings 91 and 92 to controllably generate successive bubbles as the slot 93 is traversed from one opening 91 to the other opening 92 and back. The slot 93 and the slotted openings 91 and 92 may have any desired geometry although an elliptical geometry is preferred.

FIG. 5 shows a practical arrangement embodying the principles of FIGS. 3 and 4. The same reference numerals are used to identify elements corresponding to the elements of the lower assembly 18 of the flowmeter 10 of FIG. 1 and the corresponding elements of FIG. 3. The sleeve 90 of FIG. 3 is in the form of a basket 97 having an open top 98 and a bottom 99 which is attached through a depending stem 100 to the manually rotatable lever 95. An O-ring 102 is fitted over the stem 100 to seal the opening 103 through which the stem 100 extends out from the base support 30. A plurality of openings 105 at the bottom 99 of the basket 97 permits the soap solution 41 to pass through the bottom 99 of the basket 97. The base support 30 is partly cut away to permit the lever 95 to be freely rotated about the longitudinal axis of the flowtube 12.

In the position shown in FIGS. 5 and 6 the slot 93 is out of registration with either of the slotted openings 91 and 92 to permit soap solution to rise by capillary attraction in the space 96 between the basket 97 and the flowtube 12. FIG. 7 shows the manual lever rotated into a position of registration between the slot 93 and the slotted opening 92.

What is claimed is:

1. A gas flowmeter and soap bubble generator comprising: a first closed chamber housing a soap solution; gas inlet means extending into said first chamber at a flow rate to be measured using the flowmeter; a second closed chamber spaced from the first chamber; a flowtube extending from the first chamber to the second chamber and having a hollow body through which said gas passes with a bottom open end spaced from the soap solution in said first chamber; gas exit means extending into said second chamber for discharging the gas introduced into said first chamber; bubble generating means for generating a soap bubble from said soap solution and means for measuring the time displacement of said soap bubble through the flowtube between two predetermined points, wherein said bubble generating means comprises a hoop surrounding said flowtube at the bottom open end thereof and having an annular body with a central opening larger than the diameter of the flowtube and means for controllably depressing said hoop into said soap solution to pick up a soap bubble and for raising said hoop to said flowtube to transfer said soap bubble to the bottom open end of said flow tube.

2. A gas flowmeter as defined in claim 1 wherein said means for controllably depressing and raising said hoop comprises a shaft extending into said lower chamber and a pushbutton.

3. A gas flowmeter as defined in claim 2 wherein said flowtube extends between a lower assembly forming said second chamber and further comprising diaphragm means disposed in said second chamber for dampening pulsations in gas flow through said flowtube.

4. A gas flowmeter as defined in claim 3 further comprising means for draining the soap film external of said flowtube.

5. A soap film gas flowmeter as defined in claim 4 wherein said drain means comprises:
   barrier means disposed above said open top end of said flowtube for allowing the soap film to expand and balloon outwardly from said open top end before contacting said barrier means;
   a solution trough in said second chamber for providing a continuation of the wetted surface beyond the flowtube; and
   a drain tube extending from said trough into the soap solution within said first chamber for returning accumulated residue of soap solution from said trough to said soap solution.

6. A soap film gas flowmeter as defined in claim 5 wherein said barrier means comprises a flat plate disposed in said second chamber above said flowtube in a plane lying substantially transverse to the longitudinal axis of said flowtube.

7. A gas flowmeter as defined in claim 2 wherein the annular body of said hoop is angled to form an acute angle with the horizontal.

8. A gas flowmeter and soap bubble generator comprising: a flowtube having a hollow body and opposite open ends through which a soap film is propelled, said flowtube being substantially vertically aligned between a first closed chamber into which the bottom open end of said flowtube extends and a second closed chamber into which the top open end of said flowtube extends; gas inlet means extending into said first chamber for introducing gas into said flowmeter at a flow rate to be measured using the flowmeter; gas exit means extending into said second closed chamber for discharging said gas from said flowmeter; at least two slotted openings in said flowtube of predetermined size disposed above the bottom open end thereof within said first chamber; a soap solution contained in said first chamber at a level in a range between the bottom open end of said flowtube and said slotted openings and a rotatable member surrounding said flowtube in said first chamber to form a narrow clearance between said rotatable member and said flowtube, with said rotatable member having a slot disposed at a substantially equal height relative to said slotted openings and means for rotatably adjusting the position of said rotatable member relative to the longitudinal axis of said flowtube for juxtaposing said slot into registration with said slotted opening in one position and out of registration in another position.

9. A gas flowmeter as defined in claim 8 wherein said means for adjusting the position of said rotatable member comprises a manual level.

10. A gas flowmeter as defined in claim 9 wherein said two slotted openings in said flowtube are spaced apart a predetermined distance and wherein said slot in said rotatable member is of a length greater than said predetermined distance.

11. A gas flowmeter as defined in claim 10 wherein said flowtube extends between a lower assembly forming said first chamber and an upper assembly forming said second chamber and further comprising diaphragm means disposed in said second chamber for dampening pulsations in gas flow through said flow tube.

12. A gas flowmeter as defined in claim 11 wherein said rotatable means is in the form of an open basket having a plurality of holes in the bottom thereof.

13. A gas flowmeter as defined in claim 12 wherein the bottom of said open basket has an elongated stem extending therefrom.

14. A gas flowmeter as defined in claim 13 wherein said manual lever is connected to said stem.

15. A gas flowmeter as defined in claims 11 or 14 further comprising means for draining the soap film external of said flowtube.

16. A gas flowmeter as defined in claim 15 wherein said drain means comprises:
   barrier means disposed above said open top end of said flowtube for allowing the soap film to expand and balloon outwardly from said open top end before contacting said barrier means;
   a solution trough in said second chamber for providing a continuation of the wetted surface beyond the flowtube; and
   a drain tube extending from said trough into the soap solution within said first chamber for returning accumulated residue of soap solution from said trough to said soap solution.

17. A gas flowmeter as defined in claim 15 wherein said barrier means comprises a flat plate disposed in said second chamber above said flowtube in a plane lying substantially transverse to the longitudinal axis of said flowtube.

18. A gas flow measuring device comprising: a first closed chamber having a soap solution; gas inlet means extending into said first chamber through which gas is introduced at a flow rate to be measured using the measuring device; a second closed chamber spaced from the first chamber; a flowtube having a hollow body extending from the first chamber to the second chamber and through which said gas passes; gas exit means extending into said second chamber for discharging the gas introduced into said first chamber; means for generating a film of soap from said soap solution; manually movable means for transfering said film of soap into said flowmeter at one end thereof and means including a flexible diaphragm located in said second chamber for forming an enclosure with said gas exit means and into which the gas passing through the flowtube is directed to attenuate pulsations in airflow.

19. A gas flow measuring device as defined in claim 18 wherein said means for generating a film of soap from said soap solution comprises a hoop surrounding said flowtube and wherein said manually movable means includes means for depressing said hoop into said soap solution and raising it to said flowtube.

20. A gas flow measuring device as defined in claim 18 wherein said means for generating a film of soap from said soap solution comprises a basket extending into said soap solution and surrounding said flowtube in said first chamber, with said basket having a predetermined number of slots and with said flowtube having at least one slot and wherein said manually movable means includes means for rotating said basket circumferentially about said flowtube to register at least one of said slots in said basket with the slot in said flowtube in a first position and out of registration in another position.

* * * * *